Figure 2:
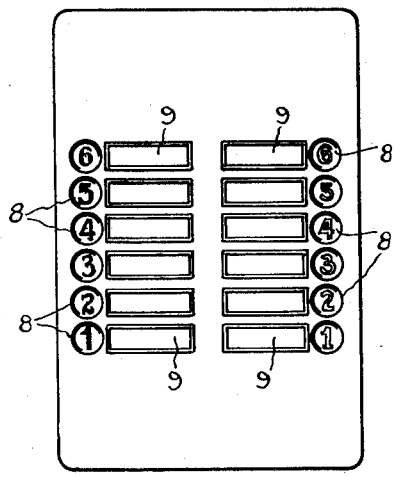

July 27, 1937.  D. H. HOLDEN ET AL  2,088,065
DIALING DEVICE
Filed May 18, 1933   2 Sheets-Sheet 1

INVENTORS
Dean H. Holden and
Armen H. Tashjian.
BY
Fay, Oberlin & Fay
ATTORNEYS

July 27, 1937.   D. H. HOLDEN ET AL   2,088,065
DIALING DEVICE
Filed May 18, 1933   2 Sheets-Sheet 2
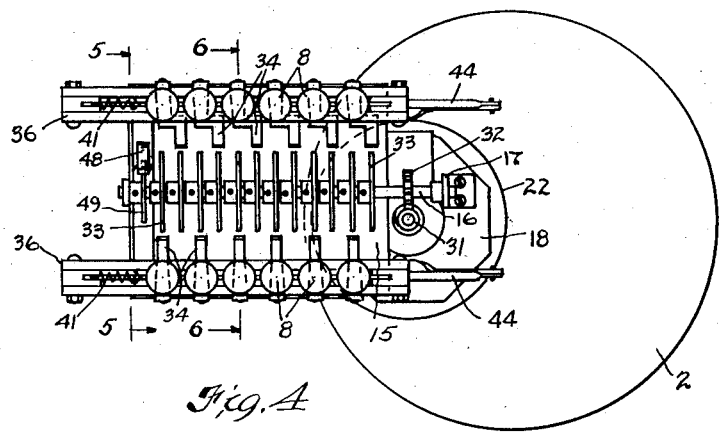
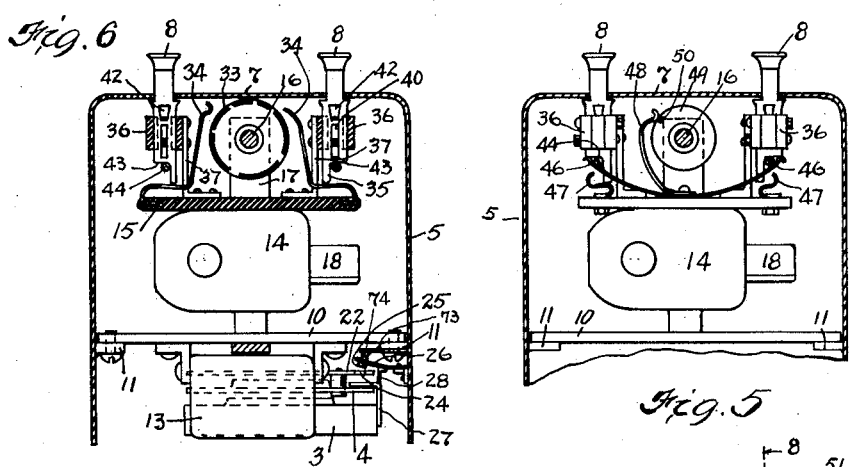
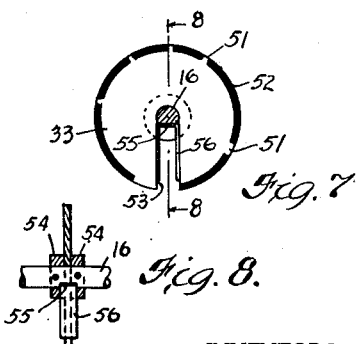
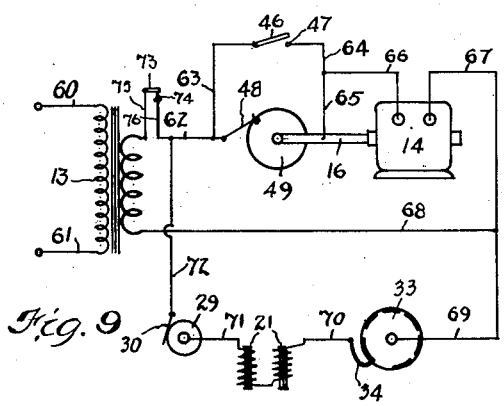
INVENTORS
Dean H. Holden and
Armen H. Tashjian.
BY Fay, Oberlin & Fay
ATTORNEYS.

Patented July 27, 1937

2,088,065

UNITED STATES PATENT OFFICE 2,088,065

DIALING DEVICE

Dean H. Holden, Cleveland, and Armen H. Tashjian, Cleveland Heights, Ohio, assignors, by direct and mesne assignments, to said Holden Application May 18, 1933, Serial No. 671,711

10 Claims. (Cl. 179—90)

The present invention relates to a device for operating an automatic dial controlled signal transmitting mechanism such as is utilized in connection with electrical switch board systems, central station paging and call systems, code signal and alarm transmitting apparatus, and the well known automatic or "dial type" telephone.

It is the general object and nature of our invention to provide a device which will automatically perform the heretofore manually accomplished function of operating a signal impulse transmitting dial upon the actuation or impression of a single instrumentality. In other words, the fundamental desideratum of the principle of the invention is to render possible the accomplishment by a single manual operation what has heretofore required a series of such operative manipulations.

It is a further object to provide a plurality of permanent records each of which is adapted to transmit through the dial mechanism a complete series of signal impulses; and in conjunction; to provide a selective key board by means of which each complete signal may be identified and selected at the will of the operator.

It is a further object to so construct these permanent records so that they may be readily removable and installed in the device from time to time when it is deemed necessary to change the available selection of signals.

Still another object is to provide a novel form of construction for our device whereby it is rendered portable and may be quickly and easily placed in registered position with the automatic dial mechanism in order to be immediately available for operation.

Another object and advantage is to so construct the device in order that it will always commence the dialing operation from a fixed or identical point of the dial, thereby eliminating lost motion incident to varying the starting position of the dialing movement for each signal impulse.

For convenience in illustration and explanation, and without intent of limitation, the device embodying the principle of our invention will be herein described and shown as designed for use with an automatic or dial type telephone.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
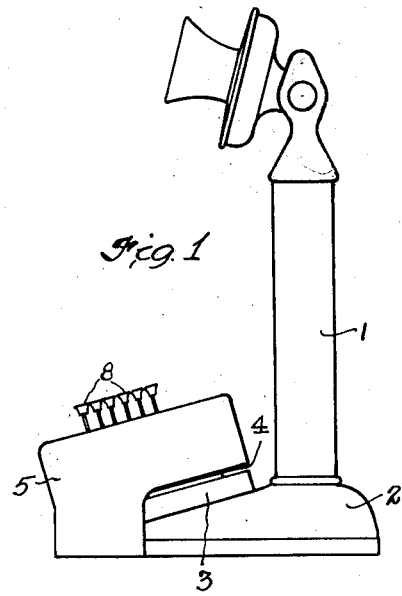
Figure 3:
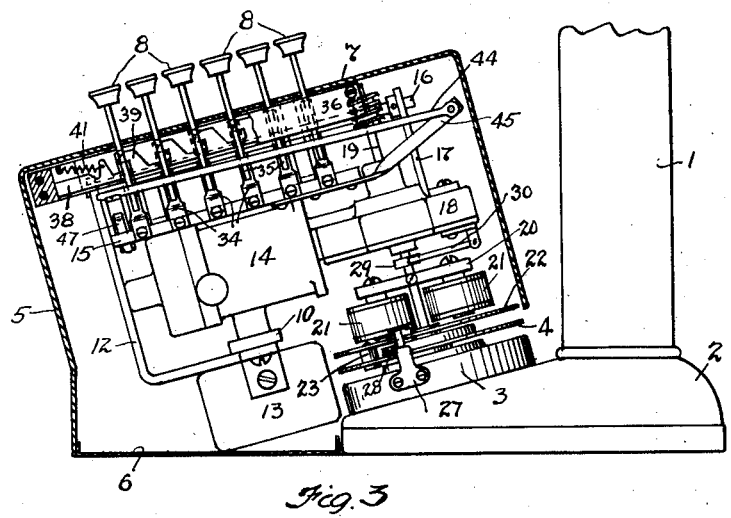

In said annexed drawings:

Fig. 1 is an elevational view showing the device constructed according to the principles of our invention in assembled position with a dial type telephone; Fig. 2 is a top plan view of the selective key board; Fig. 3 is a sectional elevation of the lower portion of Fig. 1 and on an enlarged scale; Fig. 4 is a top plan view of the interior mechanism of the device; Figs. 5 and 6 are sectional views taken on a plane normal to Fig. 4 and substantially along the lines 5—5 and 6—6 respectively thereof; Fig. 7 is an enlarged detail of one of the commutator wheels; Fig. 8 is a sectional view taken along the line 8—8 of Fig. 7; Fig. 9 is a diagrammatic representation of the electrical circuit utilized in the device.

Now referring more particularly to Figs. 1, 2, and 3, we have shown our device as applied to a dial type telephone which in the present instance is shown as the old and well known type consisting of the upright column 1 mounted upon the telephone base 2. The telephone base 2 in turn carries the dial mechanism housing 3 on the top of which is positioned the rotatable dial 4. An enclosing housing 5 which is rectangular in shape surrounds the interior mechanism of our device and is mounted upon the horizontal base 6. The top wall of the housing 7 has extending therethrough a plurality of buttons or operating keys 8 which are preferably positioned in alignment and are readily accessible to the operator. A series of labels 9 upon which may be printed certain desired names and telephone call numbers are positioned adjacent each one of the operating keys 8.

Next directing attention to Figs. 3 and 6, the interior mechanism is secured to the housing 5 by means of the horizontal frame member 10 whose ends are suitably fastened to projecting bosses 11 on the interior of the housing. An angular frame member 12 is in turn secured to the horizontal member 10 and together with the latter, serves as a means for supporting the transformer 13, the motor 14, the selective key board base 15 and the commutator shaft 16. Another vertical supporting member 17 carries the opposite end of the commutator shaft 16 and is in turn secured to the reduction gear housing 18.

The motor 14 is adapted to drive the shaft 19, which is disposed perpendicularly with respect thereto by means of a reduction gear unit which is enclosed in the housing 18. Inasmuch as the construction of such reduction gears are well known to those ordinarily skilled in the art, it is not deemed expedient to illustrate such detailed construction herein. The lower end of the shaft 19 carries a cross bar or yoke 20 which in turn mounts a pair of electromagnets 21, 21. Rotatably secured on the extreme end of the shaft 19 is the disc 22. The disc 22 is constructed of a magnetically attractive material such as steel and has the downwardly extending lug 23 which is adapted to project through the zero point opening of the telephone dial 4. An aperture 24 is provided in the disc 22, in which the lug 25 mounted upon the leaf spring 26 is adapted to register. The leaf spring 26 is mounted upon the interior wall of the housing 5 at a point immediately adjacent the limit stop 27 of the telephone dial base 3. Another small finger or lug 28 is adapted to bear against the top surface of the limit stop 27. The purpose of the last described construction is to insure that the projecting lug 23 will always engage or be inserted in the zero point opening of the dial 4 when the device is placed in position thereover. And its operation is as follows:

When the dialing device is removed from the telephone dial, the spring clip 26 will force the lug 25 into the opening 24 and thereby lock the disc 22 against rotation. Hence the lug 23 will be retained in its position corresponding to the zero point opening in the dial 4 whenever the dialing device is removed or again installed in position adjacent the telephone dial. When the device is again placed in position over the telephone dial, the finger 28 will abut against the top of the limit stop 27, thereby forcing the spring upwardly and removing the lug 25 from the opening 24 whereby the disc 22 is then free to be rotated.

A second leaf spring 73 is mounted on the interior wall housing 5 at a point immediately above the spring 26. The spring 73 is to be insulated from the wall of the housing 5 and carries a contact point 74 which is adapted to close an electric circuit through the spring 26 when the latter is in its uppermost position and to open the contacts when the spring 26 assumes its lowermost position. The purpose and mode of operation of the last described elements, which may be conveniently termed as constituting a main cut-out switch, will be subsequently set forth.

Commutator ring 29 is also positioned upon the shaft 19 at a point immediately above the yoke 20. A brush 30 makes contact with the commutator ring and is for the purpose of supplying electric current to the magnets 21, 21 in a manner which shall subsequently be described in greater detail. The upper end of the shaft 19 is connected to and adapted to drive the commutator shaft by means of the worm gear 31 and pinion 32. The commutator shaft 16 carries a plurality of make and break commutators or record wheels 33. A plurality of brushes 34 are positioned in normally spaced relationship adjacent the periphery of each one of the commutators 33. The brushes 34 are substantially L-shaped in form and are secured at their lower ends to the base plate 15 which is composed of suitable insulating material such as fiber or bakelite. The brushes 34 also possess an inherent resiliency tending to force them upwardly and outwardly away from the commutators 33. The lower ends of the operating keys 8 have the projecting fingers 35 which are adapted to bear against and depress the brushes 34. The operating keys 8 are mounted between the supporting bars 36 which are in turn carried by the angular brackets 37 secured to the base plate 15. The operating keys are longitudinally movable with respect to the supporting bars 36. A lock bar 38 having a plurality of hook shaped serrations or teeth 39 thereon extends through the slots 40 in each one of the operating keys 8. A tension spring 41 is provided on the end of the lock bars 38 and tends to urge the latter into locking position.

A second opening or slot 42 is provided in each one of the operating keys 8 and is for the purpose of receiving the hook end of the lock bar teeth 39. The operation of the last described construction is as follows:

When one of the keys 8 is depressed, the lock bar 38 will be moved against the tension of the spring 41 and when the slot 42 comes in registry with the hooked end of the teeth 39, the lock bar 38 will then be permitted to move into a position whereby the key 8 is retained in its downwardly depressed position. When a second one of the operating keys 8 is depressed, the first key which has been locked in downward position will be released by reason of the fact that the lock bar is again moved against its spring tension and the first key is accordingly unhooked.

The lower end of the operating keys 8 also possess a shoulder 43 which is adapted to bear against the longitudinally disposed rod 44. The rod 44 is pivotally supported at its one end to the supporting bracket 45 which is in turn secured to the base plate 15. The other end of the rod 44 bears against the motor switch contact arm 46. The contact arm 46 possesses an inherent resiliency tending to maintain itself in an upward position and away from the spaced contact points 47. A brush 48 is connected and secured to the central portion of the motor switch contact arm 46. The free end of the brush 48 contacts with the periphery of the motor switch wheel 49. The motor switch wheel 49 is in turn mounted upon the shaft 16 and has an insulated portion or dead spot 50 in its contacting surface.

Now directing attention to Figs. 6, 7 and 8, the commutator wheels consist of a plurality of electric contact portions 51 which are separated by the insulated portions 52, whereby during rotation of the commutators 33 in contact with their respective brushes 34, an intermittent make and break electric circuit will be made. The commutator wheels 33 have a radial slot 53 positioned therein which has a width equal to the diameter of the shaft 16. A pair of annular collars 54 are secured to the shaft 16 and spaced apart a distance equal to the thickness of the commutator wheels 33. A flattened portion 55 is provided upon the shaft 16 and is of a sufficient size to receive the end of the U-shaped spring clip 26. The arms of the U-shaped spring clip 56 bear against the sides of the radial slot 53 and retain the former in position therein whereby the commutator wheels are coincidentally removably secured to the shaft 16 in fixed axial relationship.

The arrangement and location of the contacting surfaces 51 on the periphery of the commutator wheels 33 is such that they will make an electrical contact corresponding to the length of time which is necessary to rotate the dial for the desired distance.

The electrical circuits utilized in the above described mechanism are illustrated in the wiring diagram shown in Fig. 9 and are as follows: Wires 60 and 61 connect the electrical power input to the transformer 13. Wire 75 from the output side of the transformer leads to the main cut-out switch 74 to wire 76, to wire 62 to the motor switch brush 48, and in parallel to the wire 63 to the motor switch contact arm 46, to the contact point 47 to wire 64. Wire 64 connects in parallel to wire 66 to the motor and to wire 65 to the shaft 16 which in turn is electrically connected to the motor switch commutator 49. Wire 67 leads from the motor to wire 68 to the other output side of the transformer, thus completing the motor circuit. The make and break commutator and electromagnet circuit is as follows:

Wire 68 to wire 69 to the commutator wheel 33; commutator brush 34 to wire 70 to the electromagnets 21, 21 to wire 71 to the commutator ring 29 to the commutator brush 30 and wire 72 to wire 76, to switch 74 to wire 76 to the other side of the transformer output, thus completing the circuit.

The operation of the device is as follows: When any one of the selective operating keys 8 is depressed, the rod 43 forces the contact points 46 and 47 together whereby the motor 14 is energized. Simultaneously the operating key 8 forces the commutator brush 34 into contact with the periphery of its particular commutator wheel 33. The operating key 8 must be depressed to its furthest downward position in order to actuate the motor switch contacts 46 and 47; it then is permitted to raise slightly and to open these contacts, but not to such a height as to prevent the brush 34 from moving out of contact with the commutator 33. In the meantime the motor 14 will have started and will have moved the commutator 49 past the dead spot 50, whereby the brush 48 will then maintain a closed motor circuit for one complete revolution of the commutator 49 or until the dead spot 50 again registers with the brush 48. In the meantime the commutator wheel 33 revolves and imparts a series of intermittent impulses of varying durations to the electromagnets 21, 21, while the motor 14 is energized and electromagnets 21, 21 continue to rotate. Each time that the magnets receive an impulse, they will be energized to attract the disc 22 and will correspondingly carry the disc and the dial 4 around in rotation corresponding to the length of the impulses imparted to the electromagnetic circuit.

Of course, the entire above described operation is dependent upon the closing of the main cutout switch contacts 74. This means that the device must be properly placed in position over the dial in order to close the switch 74 and to incidentally close both the motor circuit and the electromagnet circuit. The purpose of the provision of the main cutout switch is to render both the motor circuit and the electromagnet circuit inoperative when the device is removed from its operative position over the dial, in order to prevent burning out of the motor in the event that one of the operating keys 8 might be inadvertently depressed during the time that the disc 22 is locked against rotation.

From an analysis of the foregoing description, it will be seen that an equivalent driving means, such as a spring driven motor may be used in the place of the electric driving motor 14. Similarly, the number of operating keys 8 may be equally well decreased or increased, so long as the spirit of the invention is not violated.

It will thus be seen that a device constructed according to the principles of our invention not only greatly reduces the manual operation incident to the operation of an automatic dial mechanism, but also reduces the time necessary for the consummation of such an operation to a minimum. It will be readily realized that our invention possesses meritorious advantages.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. A device of the character described for operating an automatic dial mechanism, comprising the combination of a driving motor, rotating means positioned adjacent said dial and in constant engagement with said motor, dial engaging means associated with said rotating means, and control means also in constant engagement with said motor for intermittently actuating said engaging means during intervals corresponding to the dialing of individual signal impulses.

2. A device of the character described for operating an automatic dial mechanism, comprising the combination of a driving motor, rotating means positioned adjacent said dial and in constant engagement with said motor, dial engaging means associated with said rotating means, and unit control means also in constant engagement with said motor for starting said motor and for intermittently actuating said engaging means during intervals corresponding to the dialing of individual signal impulses, said control means being also adapted to automatically stop said motor after the completion of the dialing of said impulses.

3. A device of the character described for operating an automatic dial mechanism, comprising the combination of a driving motor, rotating means positioned adjacent said dial and in constant engagement with said motor, dial engaging means associated with said rotating means, a plurality of different control means also in constant engagement with said motor for intermittently actuating said engaging means during intervals corresponding to the dialing of individual signal impulses, each of said control means being adapted to transmit a complete call signal consisting of a plurality of individual signal impulses.

4. A device of the character described for operating an automatic dial mechanism, comprising the combination of a driving motor, a shaft in constant engagement with said motor and driven by said motor, said shaft being substantially coaxially disposed with respect to said dial, dial engaging means rotatably mounted on the end of said shaft, a clutch carried by said shaft for intermittently locking said dial engaging means to said shaft, and control means also in constant engagement with said motor for intermittently actuating said clutch for intervals corresponding to the dialing of an individual signal impulse and for disengaging said clutch for intervals corresponding to the return movement of said dial.

5. A device of the character described for operating an automatic dial mechanism, comprising the combination of a driving motor, a shaft in constant engagement with said motor and driven by said motor, said shaft being substantially coaxially disposed with respect to said dial, a clutch carried by said shaft for intermittently engaging said dial, a second shaft driven by said motor, a plurality of record wheels mounted on said second shaft, an electric circuit connecting each of said record wheels to said clutch, and selective switch means for connecting said record wheels in said electric circuit.

6. A device of the character described for operating an automatic dial mechanism, comprising the combination of a driving motor, rotating means positioned adjacent said dial in constant engagement with and driven by said motor, means rotatably carried by said rotating means for engaging said dial at a fixed or identical point, clutching means for intermittently locking said rotating means to said dial engaging means, selective control means for actuating said clutching means during intervals corresponding to the dialing of individual signal impulses, and for alternately rendering said clutching means inoperative during an interval sufficient to permit said dial to return to its zero point.

7. A device of the character described for operating an automatic dial mechanism, comprising the combination of a driving motor, rotating means in constant engagement with said motor, dial engaging means, an electrically actuated clutch means adapted to intermittently lock said dial engaging means to said rotating means, a plurality of make and break commutators also in constant engagement with said motor, an electric circuit connecting said commutators to said clutch means, selective switch means for connecting said commutators in said circuit, and unitary switch means operated by said selective switch means for energizing said rotating means and automatically de-energizing the latter upon the completion of the dialing of a series of signal impulses.

8. A device of the character described for operating an automatic dial mechanism, comprising the combination of a driving motor, an electromagnetic means for intermittently connecting said motor to said dial and thereby intermittently rotating said dial, and brush and commutator means for intermittently actuating said electromagnetic means, said driving motor being in constant engagement with both said electromagnetic means and said brush and commutator means.

9. A device of the character described for operating an automatic dial mechanism, comprising the combination of a driving motor, an electromagnetic means for intermittently connecting said motor to said dial, and thereby intermittently rotating said dial, brush and commutator means for intermittently actuating said electromagnetic means, and unitary driving means for continuously moving said brush and commutator means during the transmission of a complete call signal.

10. A device of the character described for operating an automatic dial mechanism comprising the combination of a driving motor, an electromagnetic means for intermittently connecting said motor to said dial and thereby intermittently rotating said dial, moving contact means for intermittently actuating said electromagnetic means, and a single electric circuit for supplying impulses of varying duration from said contact means to said electromagnetic means.

DEAN H. HOLDEN.
ARMEN H. TASHJIAN.